UNITED STATES PATENT OFFICE.

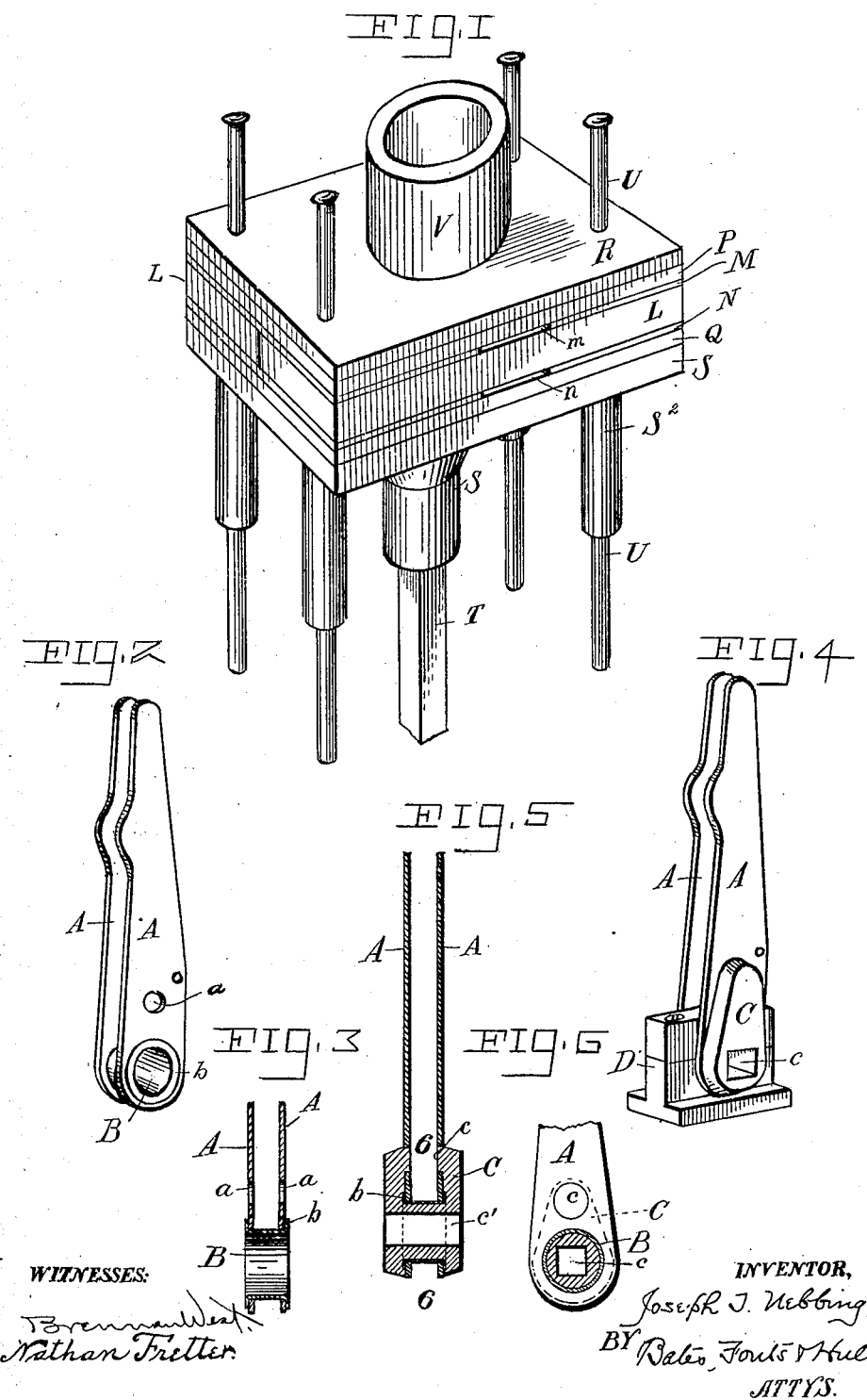

JOSEPH T. UEBBING, OF CLEVELAND, OHIO.

MACHINE PART HAVING BEARING-SLEEVE.

No. 918,399.    Specification of Letters Patent.    Patented April 13, 1909.

Application filed December 1, 1906. Serial No. 345,926.

*To all whom it may concern:*

Be it known that I, JOSEPH T. UEBBING, a citizen of the United States, residing at Cleveland, in the county of Cuyahoga and State of Ohio, have invented a certain new and useful Improvement in Machine Parts Having Bearing-Sleeves, of which the following is a full, clear, and exact description, reference being had to the accompanying drawings.

The object of this invention is to provide a very strong and light machine part in a form which shall be efficient in service and may be very cheaply constructed.

The invention covered by this application relates to the machine part, the process by which I am enabled to make the same being covered by my divisional application Serial No. 381,237, filed June 28th, 1907.

The machine part itself comprises the combination with a member selected for its strength or wearing qualities, and a reinforcing member cast directly onto the member first mentioned and operating to change the effective shape thereof or lock together different portions of the member first mentioned.

The invention is hereinafter more fully described and its essential characteristics are set out in the claims.

The drawings illustrate my invention as embodied in a machine part having a reinforced sleeve and two projecting arms, though it is to be understood that I do not limit myself to this particular structure.

Figure 1 illustrates a mold by which such machine part may be produced; Fig. 2 is a perspective view of a pair of metallic arms and a metallic sleeve which are adapted to be locked together by my casting reinforce; Fig. 3 is a partial section across the parts shown in Fig. 2; Fig. 4 illustrates the complete structure with the reinforce applied, the structure being shown in place on a suitable bearing block; Fig. 5 is a longitudinal section through the complete structure; Fig. 6 is a fragmentary section through the sleeve and reinforce.

Referring to Figs. 2 to 6, A A represent two flat arms which may be made of sheet steel; B represents a thin steel tube connecting such arms and flanged at $b$ over the outer sides of the arms. These flanges prevent the arms spreading but do not prevent one moving with reference to the other. As shown in Figs. 4, 5, and 6, C represents the reinforcing structure, which is cast through the sleeve B and over the ends thereof and along the sides of the arms, and continues by lugs $c$ into openings $a$ in such arms. Such casting locks the two arms and the sleeve into one rigid structure. While the sleeve B is cylindrical, the bore $c'$ through the casting C is shown as square. By this means the member may receive a square rock shaft, whereby the two arms may be rocked as a unit to perform the work required. Several of these machine parts may be mounted on one square shaft which, by reason of the square bore, may transmit power to them.

The two-arm structure shown is selected simply as illustrative of the central idea of locking an arm to a sleeve. These arms may be made of sheet steel. The sleeve B is also preferably of steel and may be very thin and light.

The material from which the casting is made is preferably some anti-friction material with a low melting point, as for example, a hard Babbitt metal. Fig. 4 illustrates the compound structure mounted in a suitable bearing D which may also be of Babbitt metal. It is to be noted in such mounting that the steel of the sleeve B and the inner faces of the arms thus have their bearings on Babbitt metal which reduces the friction. This is one of the advantages of my invention, that it enables a steel bearing sleeve to be provided so that a cheaply cast bearing block may be used. The sleeve may be conveniently made of hard drawn seamless tubing.

By providing the casting C with the square bore I am enabled to use this light seamless cylindrical tube for the sleeve and at the same time provide an angular opening for the reception of an angular rock shaft. The locking of the casting to the arms by means of the lugs $c$ not only prevents any twisting of the inner portion of the casting within the sleeve but holds the arms rigidly to the sleeve.

It will be seen from the above description that my invention effects the triple result of enabling the employment of a thin bearing sleeve, of providing the desired angular bore, and of rigidly locking the walls of such bore to the sleeve and arms.

In making my compound arm, by the process set out in my divisional application referred to, the operation is briefly as follows: The first step is to take the arms with openings through them and pass through such openings a sleeve B; then to pass the arms onto opposite sides of one of the two blocks L (see Fig. 1) the sleeve occupying a semi-circular recess in the edge of such block, the other block L with a corresponding semi-circular recess being then placed against the outer side of the sleeve. With the sleeve and arms in this position, the ends of the sleeve are upset or flanged by hammer blows on such ends. After the ends of the sleeve B are upset, the plates M and N are placed above and below the two plates L, the arms A being turned to project across the short dimension of one of the blocks L, such arms occupying the openings $m$ and $n$ in the plates M and N respectively. Above and below the plates M and N respectively are plates P and Q, these plates being recessed to provide the proper shape for the exterior of the casting C. Above the plate P is a plate R having a pouring opening. Below the plate Q is a block S having a tubular boss $s$ provided with a square bore. Occupying this bore is a square bar T which also occupies openings in the plates L, M, N, P, and Q, the end of the bar T abutting against the underside of the plate R.

The various plates surmounting each other as described may be locked in place by pins U passing through alined openings in the plates. Four of these openings are shown near the corners of the plates, four pins being provided. Bosses $s^2$ are also shown on the underside of block S to receive these pins. Resting on the plate R above the pouring opening may be a tubular pouring sleeve V.

Having thus described my invention, I claim:

1. As a new article of manufacture, a machine part comprising a bearing sleeve, a member into which the sleeve extends, and a reinforcing casting extending into the sleeve and upon the member, thereby locking such parts together.

2. As a new article of manufacture, a machine part comprising a bearing sleeve and an arm, and a reinforcing casting extending through said sleeve and across the ends thereof and locked to said arm.

3. The combination of a bearing sleeve, an arm, and a reinforcing casting extending into said sleeve and locked to said arm by extending into a recess in said arm.

4. The combination of a metallic sleeve, an arm surrounding the same, the sleeve being flanged over the arm, said arm having a hole through it, and a reinforcing casting extending into the bore of the sleeve and over the end thereof and along the side of the arm and into the recess therein.

5. The combination of a thin sheet metal sleeve having outwardly projecting flanged ends, and a casting within the sleeve and extending over the ends thereof and covering such flanges, said casting having a non-circular bore, whereby a reinforced bearing member is provided with an external bearing surface and flanges and a bore suitable to engage a non-circular shaft.

6. A bearing member, for a non-circular shaft, composed of two parts rigidly united, namely an external sleeve of material adapted for wear, and an internal member of relatively soft easily-melting material, said internal member being cast within the sleeve and extending beyond and over the ends thereof and having a non-circular bore.

7. A bearing member for an angular shaft, said member having an outer portion consisting of a short section of seamless drawn steel tubing and an inner portion comprising a casting of easily melting material cast within the sleeve and extending over the ends and flanges thereof and having an angular bore, whereby the member is reinforced and is provided with a cylindrical steel exterior and has flanges at the ends thereof and a bore adapted to receive an angular shaft.

8. The combination of a metallic sleeve, a pair of arms having openings through which the sleeve projects, the sleeve being up-set on the outer sides of said arms, and a casting extending through the sleeve and onto the sides of the arms.

9. The combination of a metallic sleeve, an arm surrounding the same, the sleeve being flanged over the arm, said arm having a hole through it, and a reinforcing casting extending into the bore of the sleeve and over the end thereof and along the side of the arm and into the hole therein, said sleeve being cylindrical whereby a bearing surface is presented, and said casting within the sleeve having an angular bore whereby the compound arm may be rocked.

10. The combination of a thin cylindrical sleeve, a pair of sheet metal arms having round holes surrounding the sleeve, the sleeve being flanged onto the outer sides of said arms, a casting extending integrally through the sleeve and over the ends thereof and onto the outer sides of the two arms and into openings in said arms, said casting having a non-cylindrical bore, whereby the casting may receive a member adapted to rock the structure while the sleeve furnishes a bearing member for such structure.

11. The combination of a steel sleeve, an antifriction bearing block in which the sleeve is journaled, a reinforcing casting extending through the sleeve and over the ends thereof, and an arm mounted on said sleeve, said casting extending onto the outer side of the arm and adapted to lock the same to said sleeve.

12. The combination of a cylindrical sleeve, having a flange, a member secured thereto by said flange, and a casting occupying the sleeve and locking the member thereto.

13. The combination of a cylindrical sleeve, a member having an opening surrounding the sleeve, the sleeve being up-set on the side of the member, and a casting extending into the bore of the sleeve and upon the side of the member.

In testimony whereof, I hereunto affix my signature in the presence of two witnesses.

JOSEPH T. UEBBING.

Witnesses:
ALBERT H. BATES,
S. E. FOUTS.